US011475910B2

(12) United States Patent
Jun et al.

(10) Patent No.: US 11,475,910 B2
(45) Date of Patent: Oct. 18, 2022

(54) SYSTEM AND METHODS FOR MACHINE ANOMALY DETECTION BASED ON SOUND SPECTROGRAM IMAGES AND NEURAL NETWORKS

(71) Applicant: Purdue Research Foundation, West Lafayette, IN (US)

(72) Inventors: Martin Byung-Guk Jun, West Lafayette, IN (US); Hanjun Kim, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

(21) Appl. No.: 17/173,946

(22) Filed: Feb. 11, 2021

(65) Prior Publication Data

US 2021/0256991 A1 Aug. 19, 2021

Related U.S. Application Data

(60) Provisional application No. 62/972,814, filed on Feb. 11, 2020.

(51) Int. Cl.
*H04R 29/00* (2006.01)
*G10L 25/51* (2013.01)
(Continued)

(52) U.S. Cl.
CPC ................ *G10L 25/51* (2013.01); *G06N 3/08* (2013.01); *G10L 25/18* (2013.01); *G10L 25/30* (2013.01); *H04R 1/08* (2013.01)

(58) Field of Classification Search
CPC ...................................................... H04R 29/00
See application file for complete search history.

(56) References Cited

U.S. PATENT DOCUMENTS 5,435,185 A * 7/1995 Eagan .................... G01N 29/14 73/592
10,413,271 B2 * 9/2019 Tsai ......................... A61B 7/04
(Continued)

OTHER PUBLICATIONS

Syafrudin, M., Alfian, G., Fitriyani, N. L., & Rhee, J. (2018). Performance Analysis of IoT-Based Sensor, Big Data Processing, and Machine Learning Model for Real-Time Monitoring System in Automotive Manufacturing. Sensors (Basel), 18(9). https://doi.org/10.3390/s18092946.

(Continued)

*Primary Examiner* — Olisa Anwah
(74) *Attorney, Agent, or Firm* — Purdue Research Foundation

(57) ABSTRACT

A system and methods for machine anomaly and behavior classification is provided. An audio capture device may attach to a mechanical apparatus comprising a first component and a second component. The first component and second component may separately generate audible noise. The capture device may include a body, a diagraph disposed in the body, and a microphone. The diagraph may vibrate in response to sound generated by the mechanical device. The microphone may generate a signal in response audio caused by the vibrating diagram. The system may receive the signal generated by the microphone of the audio capture device. The system may determine, based on a machine learning model and the signal, an anomalous event associated with the first component, a second component, or a combination thereof. Alternatively, or in addition, the system may classify operation of the machine based on second machine learning model.

17 Claims, 11 Drawing Sheets

(51) Int. Cl.

| | |
|---|---|
| ***G10L 25/18*** | (2013.01) |
| ***G06N 3/08*** | (2006.01) |
| ***G10L 25/30*** | (2013.01) |
| ***H04R 1/08*** | (2006.01) |

(56) References Cited

U.S. PATENT DOCUMENTS

| | | | | |
|---|---|---|---|---|
| 10,709,353 | B1 * | 7/2020 | McLane | A61B 5/7267 |
| 10,765,399 | B2 * | 9/2020 | Emmanouilidou | A61B 7/026 |
| 2010/0122866 | A1 * | 5/2010 | Cammilleri | A61B 7/02 181/131 |
| 2011/0096936 | A1 * | 4/2011 | Gass | A61B 7/04 381/67 |
| 2013/0041278 | A1 * | 2/2013 | Bai | A61B 7/003 600/529 |
| 2021/0321972 | A1 * | 10/2021 | Matula | G10K 11/08 |

OTHER PUBLICATIONS

Madhusudana, C. K., Kumar, H., & Narendranath, S. (2017). Face milling tool condition monitoring using sound signal. International Journal of System Assurance Engineering and Management, 8(S2), 1643-1653. https://doi.org/10.1007/s13198-017-0637-1.

Kothuru, A., Nooka, S. P., & Liu, R. (2017). Cutting Process Monitoring System Using Audible Sound Signals and Machine Learning Techniques: An Application to End Milling. International Manufacturing Science and Engineering Conference.

Aghazadeh, F., Tahan, A., & Thomas, M. (2018). Tool condition monitoring using spectral subtraction and convolutional neural networks in milling process. The International Journal of Advanced Manufacturing Technology, 98(9-12), 3217-3227. https://doi.org/10.1007/s00170-018-2420-0.

Purohit, H., Tanabe, R., Ichige, K., Endo, T., Nikaido, Y., Suefusa, K., & Kawaguchi, Y. (2019). MIMII Dataset: Sound dataset for malfunctioning industrial machine investigation and inspection. arXiv preprint arXiv: 1909.09347.

Keselj, V. (2009). Speech and Language Processing Daniel Jurafsky and James H. Martin (Stanford University and University of Colorado at Boulder) Pearson Prentice Hall, 2009, xxxi+ 988 pp; hardbound, ISBN 978-0-13-187321-6, $115.00. In: MIT Press.

Nasir, V., Cool, J., & Sassani, F. (2019). Intelligent Machining Monitoring Using Sound Signal Processed With the Wavelet Method and a Self-Organizing Neural Network. IEEE Robotics and Automation Letters, 4(4), 3449-3456. https://doi.org/10.1109/lra.2019.2926666.

Benkedjouh, T., Medjaher, K., Zerhouni, N., & Rechak, S. (2013). Health assessment and life prediction of cutting tools based on support vector regression. Journal of Intelligent Manufacturing, 26(2), 213-223. https://doi.org/10.1007/s10845-013-0774-6.

Li, X., Zhang, W., Ding, Q., & Sun, J.-Q. (2018). Intelligent rotating machinery fault diagnosis based on deep learning using data augmentation. Journal of Intelligent Manufacturing, 31(2), 433-452. https://doi.org/10.1007/s10845-018-1456-1.

Zhong, R. Y., Wang, L., & Xu, X. (2017). An IoT-enabled Real-time Machine Status Monitoring Approach for Cloud Manufacturing. Procedia CIRP, 63, 709-714. https://doi.org/10.1016/j.procir.2017.03.349.

Cooper, C., Zhang, J., Gao, R. X., Wang, P., & Ragai, I. (2020). Anomaly detection in milling tools using acoustic signals and generative adversarial networks Procedia Manufacturing, 48, 372-378.

Kim, H. (2019). Machine Anomaly Detection using Sound Spectrogram Images and Neural Networks Purdue University Graduate School].

Kim, J., Lee, H., Jeong, S., & Ahn, S.-H. (2021). Sound-based remote real-time multi-device operational monitoring system using a Convolutional Neural Network (CNN). Journal of Manufacturing Systems, 58, 431-441. https://doi.org/10.1016/j.jmsy.2020.12.020.

Kothuru, A., Nooka, S. P., & Liu, R. (2017). Application of audible sound signals for tool wear monitoring using machine learning techniques in end milling. The International Journal of Advanced Manufacturing Technology, 95(9-12), 3797-3808. https://doi.org/10.1007/s00170-017-1460-1.

Mühlbauer, M., Würschinger, H., Polzer, D., Ju, S., & Hanenkamp, N. (2020). Automated Data Labeling and Anomaly Detection Using Airborne Sound Analysis. Procedia CIRP, 93, 1247-1252.

Koizumi, Y., Saito, S., Uematsu, H., Kawachi, Y., & Harada, N. (2018). Unsupervised detection of anomalous sound based on deep learning and the neyman-pearson lemma. IEEE/ACM Transactions on Audio, Speech, and Language Processing, 27(1), 212-224.

Linnhoff-Popien, C., Illium, S., Ritz, F., & Müller, R. (2021). Acoustic Anomaly Detection for Machine Sounds based on Image Transfer Learning Proceedings of the 13th International Conference on Agents and Artificial Intelligence.

Zhou, Y., Sun, B., Sun, W., & Lei, Z. (2020). Tool wear condition monitoring based on a two-layer angle kernel extreme learning machine using sound sensor for milling process. Journal of Intelligent Manufacturing. https://doi.org/10.1007/s10845-020-01663-1.

Peng, C. Y., Raihany, U., Kuo, S. W., & Chen, Y. Z. (2021). Sound Detection Monitoring Tool in CNC Milling Sounds by K-Means Clustering Algorithm. Sensors (Basel), 21(13). https://doi.org/10.3390/s21134288.

Tsuji, K., Imai, S., Takao, R., Kimura, T., Kondo, H., & Kamiya, Y. (2021). A machine sound monitoring for predictive maintenance focusing on very low frequency band. SICE Journal of Control, Measurement, and System Integration, 14(1), 27-38. https://doi.org/10.1080/18824889.2020.1863611.

Luo, B., Wang, H., Liu, H., Li, B., & Peng, F. (2019). Early Fault Detection of Machine Tools Based on Deep Learning and Dynamic Identification. IEEE Transactions on Industrial Electronics, 66(1), 509-518. https://doi.org/10.1109/tie.2018.2807414.

Chu, S., Narayanan, S., & Kuo, C. C. J. (2009). Environmental Sound Recognition With Time-Frequency Audio Features. IEEE Transactions on Audio, Speech, and Language Processing, 17(6), 1142-1158. https://doi.org/10.1109/tasl.2009.2017438.

Yun, H., Kim, H., Kim, E., & Jun, M. B. (2020). Development of internal sound sensor using stethoscope and its applications for machine monitoring. Procedia Manufacturing, 48, 1072-1078.

Lopez, J. A., Lu, H., Lopez-Meyer, P., Nachman, L., Stemmer, G., & Huang, J. (2020). A speaker recognition approach to anomaly detection. Detection and Classification of Acoustic Scenes and Events Workshop (DCASE).

Xue, W., Kusumoto, K., & Nezu, K. (2013). Analysis of acoustic characteristics for plasma arc cutting. Science and Technology of Welding and Joining, 8(6), 443-449. https://doi.org/10.1179/136217103225005606.

Xue, W., Kusumoto, K., & Nezu, K. (2004). Measurement and Analysis of Plasma Arc Cutting Acoustic Signal. Materials Science Forum, 449-452, 313-316. https://doi.org/10.4028/www.scientific.net/MSF.449-452.313.

Kusumoto, K., Chen, Q. G., & Xue, W. (2013). Monitoring of plasma arc cutting process by cutting sound. Science and Technology of Welding and Joining, 11(6), 701-706. https://doi.org/10.1179/174329306x150379.

* cited by examiner

100

SYSTEM AND METHODS FOR MACHINE ANOMALY DETECTION BASED ON SOUND SPECTROGRAM IMAGES AND NEURAL NETWORKS

CROSS REFERENCE TO RELATED APPLICATIONS

This application claims the benefit of U.S. Provisional Application No. 62/972,814 filed Feb. 11, 2020, the entirety of which is hereby incorporated by reference.

TECHNICAL FIELD

This disclosure relates to device monitoring and, in particular, to device monitoring with machine learning and sound processing.

BACKGROUND

In the new era of manufacturing with the Industry 4.0, effective machine monitoring systems are an important aspect of smart manufacturing. Unexpected failure of machinery may cause devastating costs, or even worse, dangerous incidents. Prominent methodologies for identification and prediction of the machine conditions and their dynamic behavior are typically physics-based or the data-driven. Although their processing strategies are quite different, both methods typically utilize various sensor signals such as torque, vibration, emission, and currents. The physics-based approach takes a variety of static and dynamic parameters into considerations to develop a precise model based on a comprehensive knowledge about physical attributes of the subjects. On the other hand, the data-driven methods emphasize feature extraction, which accounts for deriving compressed and meaningful information from raw sensor signals. The sensors and devices required to collect data and process data under traditional methods often involve costly implementation and specific instrumentation.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

Data driven approaches to identification and prediction of the machine conditions have historically relied on voluminous operating information obtained from sensor(s). The operating information may capture machine behavior during a fault condition. Such faults may be categorized according to the machine status. It is not always possible to denote every sort of anomaly, which may lead to diagnostic failure (or false alarm). Furthermore, it is not always possible to collect the data from machines under the anomalous conditions. Imposing artificial defects on machine components allows to collect useful data, however it may induce severe failure in the machine.

Another consideration on machine monitoring is cost-effectiveness demands of small footprint and low-cost sensors for Internet of Things (IoT). For monitoring machine conditions, sound sensing may be more affordable solution for machine monitoring than force or vibration measurement since the total costs for sensors and signal conditioning devices are not required when using numerous sensors at the same time. However, sound signals captured using a microphone are susceptible to external noise. Ambient sounds from other machinery and humans can be mixed to the recorded sounds, making it difficult to find the acoustic location. Moreover, machine monitoring may involve multiple microphones positioned at various locations/distances from the machine.

To address these and other deficiencies, a system for machine anomaly and behavior classification is provided. By way of introductory example, the system may include an audio capture device. The audio device may attach to a mechanical apparatus comprising a first component and a second component. The first component and second component may separately generate audible noise. The audio capture device may include a body, a diagraph disposed in the body, and a microphone. The diagraph may vibrate in response to sound generated by the mechanical device. The microphone may generate a signal in response audio caused by the vibrating diagram. The system may receive the signal generated by the microphone of the audio capture device. The system may determine, based on a machine learning model and the signal, an anomalous event associated with the first component, a second component, or a combination thereof. Alternative or in addition, the system may classify operation of the machine based on another machine learning model. The system may output a data message indicative of the anomalous event and/or the classified operation.

Figure 1:
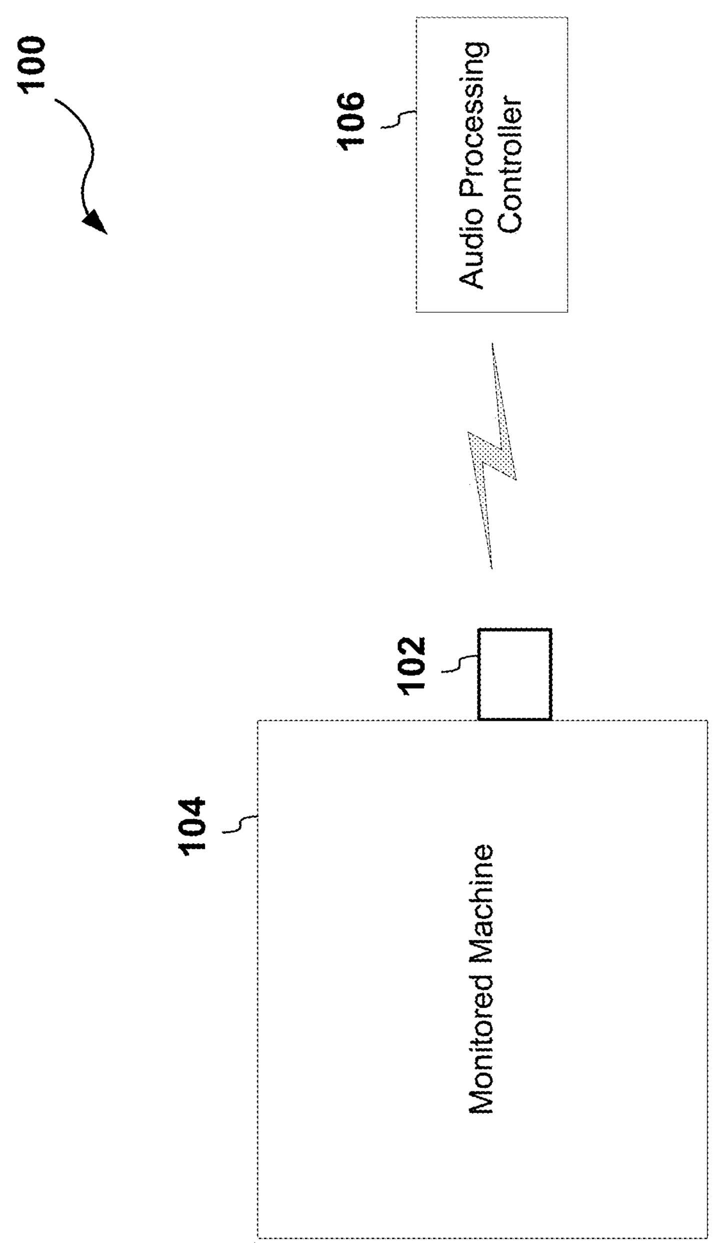
FIG. 1 illustrates a first example of a system.

FIG. 1 illustrates a first example of a system 100. The system may include an audio capture device 102. The audio capture device 102 may include a device which captures sound generated by a monitored machine 104 and converts the sound into an audio signal. The audio signal may include an analog and/or digital signal that is transmittable via wired and/or wireless communication. The system 100 may further include an audio processing controller 106. The audio processing controller 106 may apply machine learning to detect anomalous machine behavior and/or classify machine operation.

A technical challenge that may arise with monitoring machinery based on sound is that the audio signal may be subject to noise. For example, the audio capture device 102 may be located in an environment where other machines, workers, equipment, etc., generate sound, which may be undesirably captured by the audio capture device 102. Accordingly, the audio capture device 102 may be designed to limit, dampen, and/or eliminate environmental and/or unwanted sound.

Figure 2:
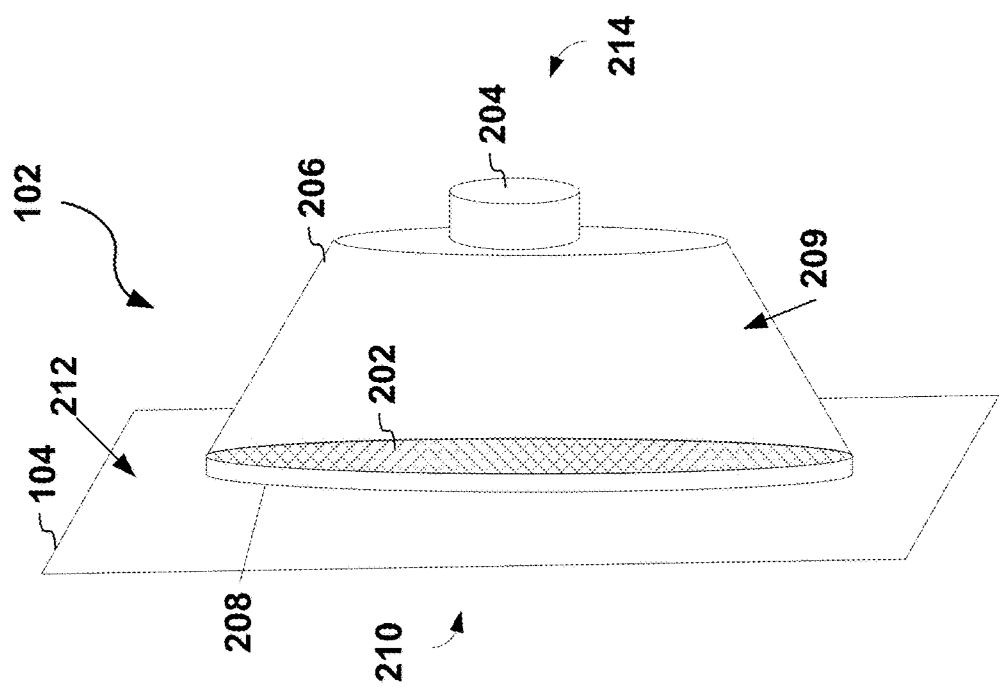
FIG. 2 illustrates a first example of an audio capture device.

FIG. 2 illustrates a first examples of the audio capture device 102. The audio capture device 102 may include a diaphragm 202, a microphone 204, and a body 206. The diaphragm 202 may include a flexible material and/or membrane that vibrates in desired frequency range in response to internally transmitted sound. The diaphragm also acts as an amplifier to increase sound level in desired frequency range and to decrease noise in undesired frequency range.

The body 206 may include a shell or housing that defines a cavity 209 within. The body 206 may include an outer edge 208 on the first side 210 of the body 206. The outer edge 208 may define an opening on the first side 210 of the body 206. The outer edge 208 may rest on an outer surface 212 of the monitored machine 104. Alternatively or in addition, a gasket or O-ring may be included in or affixed to the outer edge 208. Sound from the machine 104 may be channeled by the opening of the body 206 and received by the cavity 209.

The diaphragm 202 may be disposed in the body 206. For example, the diaphragm 202 may be disposed between the opening and the cavity 209. Thus, when affixed to the machine 104, the diagram 202 may be offset from the outer surface 212 of the machine to enable movement of the diagraph. For example, the outer edge may protrude from the body 208 to form a gap between the diaphragm and the outer surface 202 of the machine. Accordingly, changes in pressure cause by vibration of the machine may cause the diaphragm 202 to vibrate, and the vibrating diaphragm 202 may cause pressure changes in the cavity.

The body 206 may receive the microphone 204 at various locations. For example, the cavity 209 may receive the microphone 204 such that the microphone 204 is at least is at least partially disposed within body 206. In some examples, the microphone 204 may be positioned a second side 214 of the body 206, opposite the diaphragm 202. Alternatively, the microphone 204 may be disposed at other locations of the body 206.

In some examples, the body 206 of the audio capture device 102 may be tapered. For example, the body 206 of the audio device may taper from the first side 210 to the second side 214 such that the body 206 converges toward the second side. The tapering may define a code-shaped portion. Alternatively or in addition, the tapering may define a shape such as that included in a stethoscope.

In some examples, noise minimization is achieved by distancing the microphone 204 from the machine being monitored.

Figure 3:
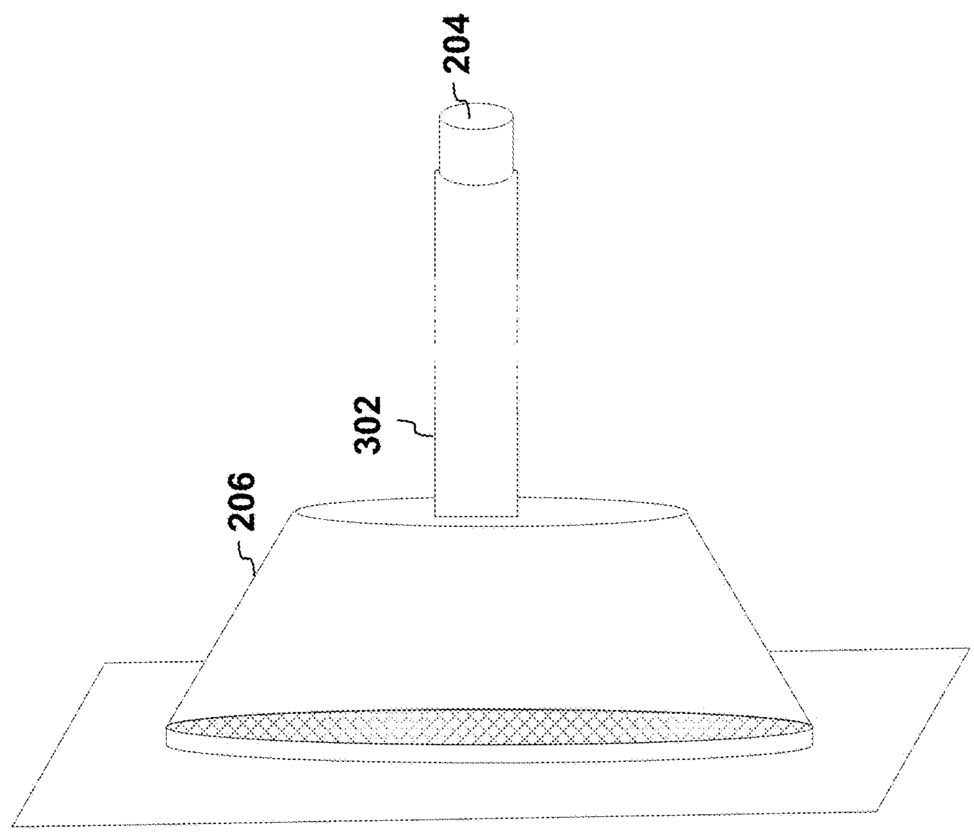
FIG. 3 illustrates a second example of an audio capture device.

FIG. 3 illustrates a second example of the audio capture device 102. The audio capture device 102 may include a hose 302 that extends away from the body 206. In some examples, the hose may be flexible which, among other benefits, allows the sensor to be located strategically on the machine. The hose 302 may include hollow interior where variations in air pressure are channeled. The microphone 204 may be connected to, positioned adjacent, and/or at least partially disposed in the hose 302 such that the microphone 204 receives sound traveling from the body 206.

Figure 4:
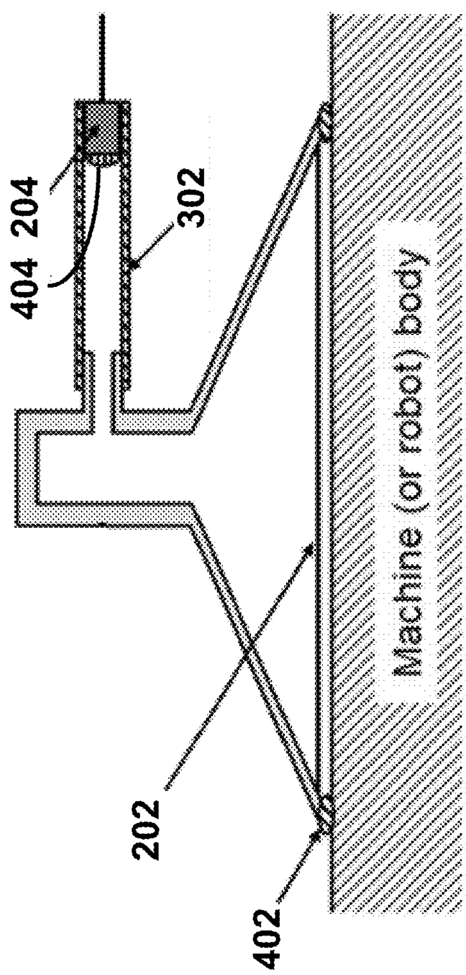
FIG. 4 illustrates a third example of an audio capture device.

FIG. 4 illustrates a third example of the audio capture device. The audio capture device may include a seal 402 that distances the body from the surface. The seal may include, for example, a gasket, o-ring, or chemically applied substance. The seal may have flexibility to dampen the vibration of the machine being monitored. The seal may also distance the body and/or diaphragm from the machine's surface. The machine's surface and diagram may define a gap, as previously discussed.

In some examples, the microphone may be at least partially disposed in the hose 302. The microphone may include a receiving region 404. The receiving region 404 may include, in some examples, a diaphragm that drives a coil based on changes in pressure. The receiving region 404 may be disposed in the tube. In some examples, the inner surface of the tube 302 may contact the outer surface of the microphone such that external noise is sealed off. For example, the microphone 204 may be at least partially friction fitted inside of the tube 302.

Figure 5:
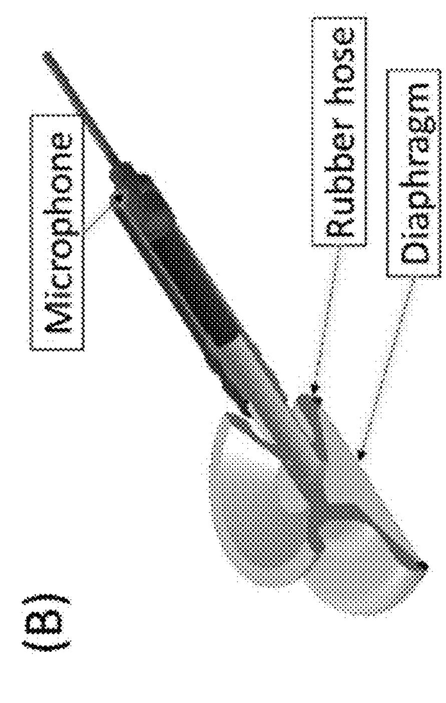
FIG. 5 illustrates a fourth example of an audio capture device.

FIG. 5 illustrates a fourth example of the audio capture device. The audio capture device shown in FIG. 5 is shaped similar to a stethoscope. The audio capture device may be referred to as a stethoscope, as described herein, though it should be appreciated that the stethoscope is enhanced and improved for the purposes of machine monitoring, as described herein The audio capture device described herein may, according to various aspects, amply sound at lower frequencies (i.e. 37.5 HZ-112.5) hz. The hose may prevent sound dispersion and the distance afforded by the hose may distance the microphone away from the machine further reducing ambient influence. In addition, the receiving portion microphone may disposed inside of the house and the hose may seal around the microphone further reducing ambient influence. The audio signal may provided by the audio capture device may undergo further processing to identify machine behavior and malfunctions.

Figure 6:
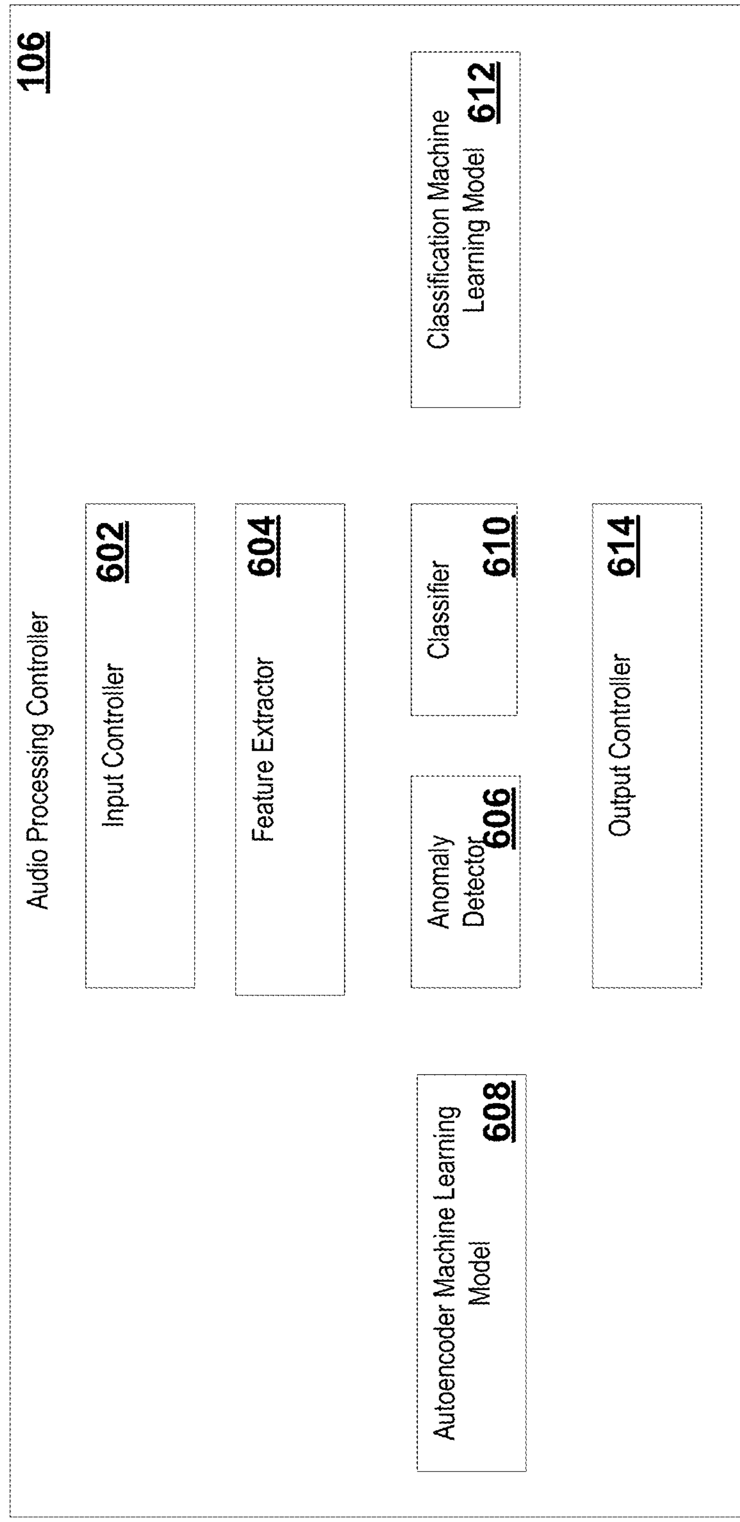
FIG. 6 illustrates an example of an audio processor controller.

FIG. 6 illustrates an example of the audio processing controller 106. The audio processing controller 106 may include an input interface 602, a feature extractor 604, an anomaly detector 606, an autoencoder machine learning model (hereinafter autoencoder model) 608, a classifier 610, classification machine learning model (hereinafter classification model) 612, and an output controller 614.

Figure 7:
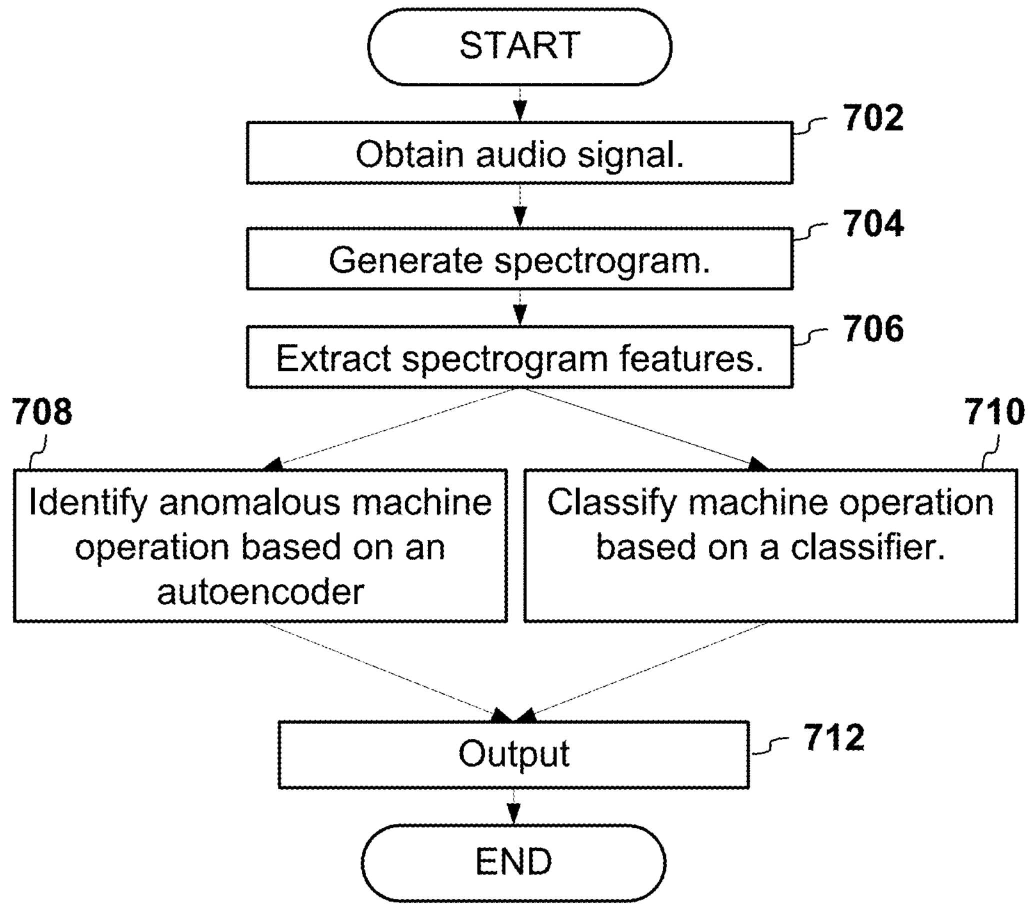
FIG. 7 illustrates an example of logic for an audio processing controller.
Figure 8:
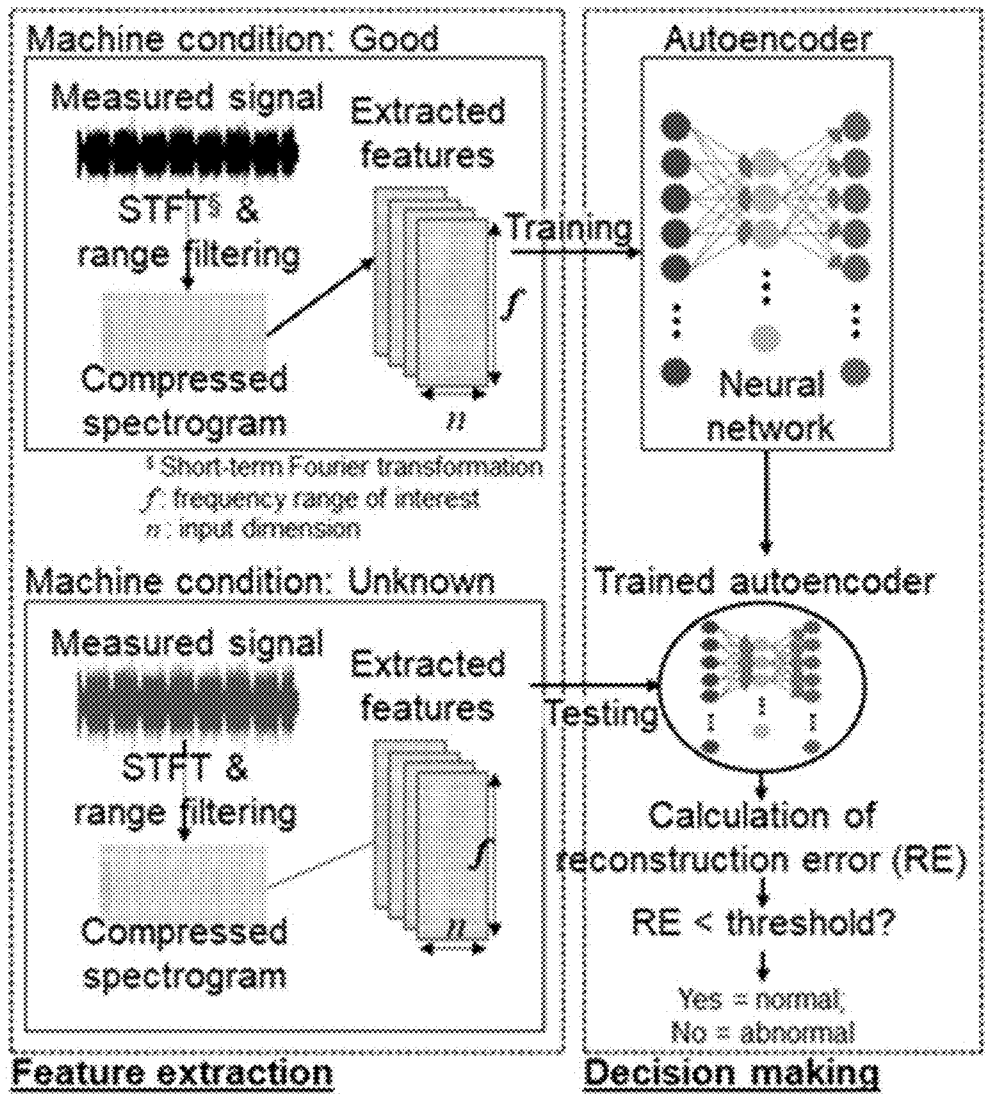
FIG. 8 illustrates a first example of logic for anomaly detection based on an autoencoder.
Figure 9:
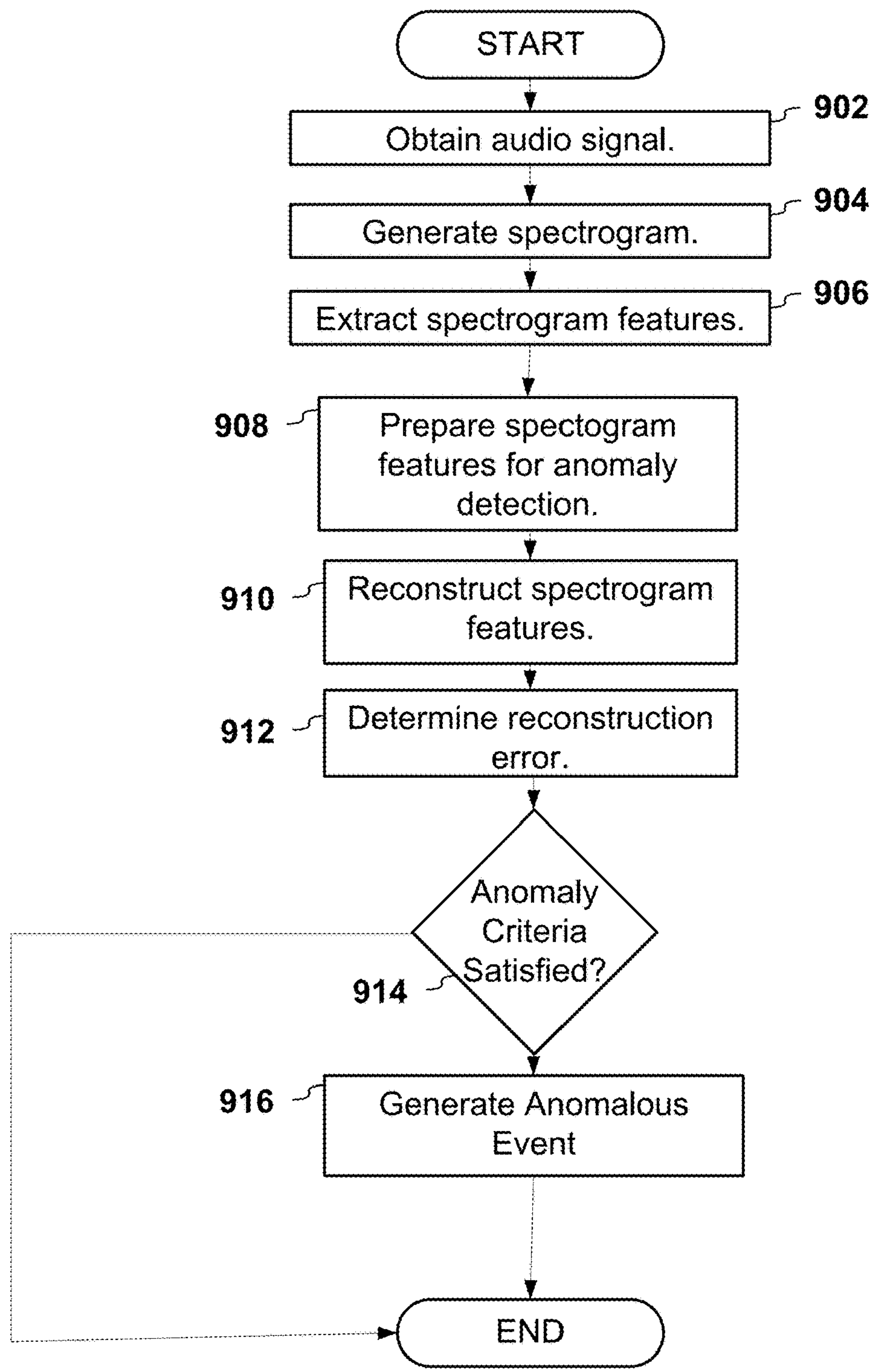
FIG. 9 illustrates a second example of logic for anomaly detection based on an autoencoder.

FIG. 7 illustrates example of logic for the audio processing controller 106. Reference to FIG. 6 is made throughout the following discussion of FIG. 7. The input controller 602 may obtain an audio signal (702). The audio signal may be generated by, for example, the audio capture device (refer to FIGS. 1-5 and the related discussion for examples of the audio capture device). The system may generate a spectrogram (704) and then extract features from the spectrogram (706). Based on the extracted features, the anomaly detector 606 may identify anomalous machine operation based on the autoencoder machine learning model 608 (708). Refer to FIGS. 8-9 and the related discussion for example flow logic for anomalous operation detection. Alternatively or in addition, the classifier 610 may classify machine operation based on the classification machine learning model 612 (710) Refer to FIG. 10 and the related discussion for further description of machine operation classification.

The output controller 614 may output a data message comprising (or representative of) the anomalous event and/or the operation event. Alternatively or in addition, the output controller may map the anomalous event, the operation event, and/or a component identified as creating the anomaly. Accordingly, the output controller may enable a user or device to receive information descriptive of anomalous behavior by a machine or component and the types of activity that may have caused the anomalous behavior.

It should be appreciated that the logic flow described in reference to FIG. 7 may include additional, fewer, or different operations than illustrated. Also, in some examples, the system may perform anomaly detection without classification or classification without anomaly detection.

FIG. 8 illustrates a first example of logic for anomaly detection based on an autoencoder.

Sound signals measurement. The audio capture device(s) and me be positioned at their attachment site(s) (equivalently, target site(s)) on the target machine. The input controller may then receive audio signals captured during machine operation. The Feature extractor may transform the audio signals into spectrograms in frequency domain using short-term Fourier transform (STFT). The spectrograms are compressed into features by filtering, which are spectrogram within the frequency range of interest. The spectrogram, which is a sound signal magnitude versus frequency is a one-dimensional image (i.e. array), may be extended into a two-dimensional image by concatenating in order of time. The features, i.e. the spectrogram image, are inputs of autoencoder, also they play the role of reference outputs for training the autoencoder. The dimension of input and the depth of the autoencoder is predefined.

Training an autoencoder. Audio signals, which are considered as "normal" or "acceptable", are collected to train the autoencoder. To select the structure of autoencoder, changing hyperparameters are performed. Features are extracted from sound spectrograms generating 2D images, and then fed into the autoencoders. For the convenience, the sound signals are recorded longer than the input dimension, then the images are divided into several features. The input dimension is decided for each joint with several numbers (n=4, 8, 16, 32) and the one with minimum loss is accepted.

Testing the trained model and making decision (i.e. detecting anomaly). The signals under "normal" and "anomalous" conditions are collected for testing. Again, the features are extracted in the same way, then fed forward into the trained autoencoder. Here, different weights are loaded on the end effector of robot. In normal conditions, the weight less than the allowable level of the robot is loaded, whereas heavier loads attached to the robot are regarded as anomalous state in this study. In this regard, feasible thresholds E are preliminarily set between "normal" and "abnormal" status in each axis. Here, RE is the difference between reconstructed features, which are the output of autoencoder (i.e. the reconstructed spectrogram image) and its corresponding input. After the thresholds are set for each joint, the model is used to detect the anomaly by comparing the RE with its corresponding threshold.

FIG. 9 illustrates a second example of logic for anomaly detection based on an autoencoder.

The input controller may obtain audio signals (902). The feature extractor 604 may generate a spectrogram (904). A spectrogram may include a representation of a spectrum of frequencies of the audio signal as it varies with time. Various analytics may provide the spectrogram. By way of example, STFT, which is a Fourier-related transformations, analyzes the frequency and phase content of any segment of a signal from a time-varying system. The STFT can be expressed as follows:

$$V(\omega)|_{t=\tau} = \sum_{n=-\infty}^{\infty} v(n)w(n-\tau)e^{-i\omega n} \quad (1)$$

where, v, w, and V are the sound signal at time n, the window function, and discrete Fourier transform of windowed signal centered about time τ, respectively. The spectrogram vector $PSD_\tau(\omega)$ at time z can be obtained by squaring the magnitude of V, therefore, it corresponds to the power spectral density (PSD) of V as shown in (2).

$$PSD(\omega)|_{t=\tau} = |(V(\omega)|_{t=\tau})|^2 \quad (2)$$

Sound signal obtained at sampling frequency of $f_{sampling}$, which is high enough to cover the frequency range of interest [0, $f_{interest}$] in monitoring with satisfying Nyquist frequency, are converted into spectrograms using STFT with windowing at every second, therefore the frequency resolution of the spectrograms is 1 Hz. By generating spectrograms, impact moments or other machine activity may be identified as features when spectral patterns vary.

The feature extractor may extract spectrogram features from the generated spectrogram (906). For example, acquired signals may be converted into spectrogram at a regular time interval. The PSDs may be filtered up to a predetermined frequency providing a fixed length vector for each PSD.

By way of example, the power spectral densities (PSDs) may be filtered up to $f_{interest}$ Hz. The first $f_{interest}$ points an in each PSD vector are selected for achieving the bandwidth up to $f_{interest}$ Hz, since the frequency resolution of the raw spectrogram is 1 Hz. After this, each PSD has a length of $|f_{interest}+1|$.

Referring to operations 908-916, the feature extractor may prepare spectrogram features for anomaly detection (908). For example, the filtered PSDs may be normalized to have values within 0 and 1 using (eqn3), in which $PSD^k$ (i) is $i^{th}$ component in $k^{th}$ PSD of spectrogram. This step is required since a sigmoid activation function is used in the output layer of the autoencoder, which is bounded between 0 and 1.

$$PSD^k_{norm}(i) = \frac{PSD^k(i) - \min(PSD^k)}{\max(PSD^k) - \min(PSD^k)} \quad (3)$$

After normalization, successive PSDs are concatenated horizontally along the time axis. Since training autoencoder with one-dimensional (1D) PSDs may lead to confusion between normal and abnormal conditions, the number of n PSDs are combined into two-dimensional (2D) PSD sequences to construct a 2D input for a certain time interval for the autoencoder. The concatenation of 1D PSDs results in 2D images with a size of n. Therefore, $k^{th}$ 2D feature F(k) can be configured through (4), where m is the amount of overlap. The $k^{th}$ feature starts from $k^{th}$ PSD to make features overlap with each other. The overlaps are assigned among the features to cover the entire range since it is difficult to make the recordings synchronized with machine operation.

$$F(k) = [PSD_{norm}^{mk} | PSD_{norm}^{mk+1} | \ldots | PSD_{norm}^{mk+n-1}] \quad (4)$$

The anomaly detector may reconstruct spectrogram features based on the prepared spectrogram features (910). For example, anomaly detector may access the autoencoder model 608 for the reconstruction.

An autoencoder is one of semi-supervised learning based NN architectures, which is a popular approach in image reconstruction and denoising. The term "semi-supervised" comes from the aspect that an autoencoder makes use of inputs as targets for reference. Encoding stage finds a compressed original input (PSD), and decoding stage produces an output that mimics the original input. In this example, the general type of stacked autoencoder is used.

It is assumed that there is a sequence composed of n-dimensional vectors $X^{(i)}$s, $\{X^{(1)}, X^{(2)}, X^{(3)}, \ldots\}$, where $X^{(i)} \in R^n$. The autoencoder tries to adapt output $Y^{(i)}$ close to the original input $X^{(i)}$. The feedforward process is as follows:

$$\text{(Hidden Layer) } Z^{(i)} = \sigma_{enc}(W_E X^{(i)})$$

$$\text{(Output Layer) } Y^{(i)} = \sigma_{dec}(W_D Z^{(i)}) \quad (5)$$

where, $W_E$ and $W_D$ are the weight arrays of encoder and decoder, σ is the activation function, and Z is the output of hidden layer, respectively. The error between $X^{(i)}$ and $Y^{(i)}$ is named as reconstruction error (RE) which is also represented as a loss function $\text{Loss}(x^{(i)},y^{(i)})$ of the autoencoder. RE is computed after calculating output layer, and the "learning" yields minimizing the loss so that the reconstructed images resemble the original inputs (i.e. spectrogram images). In this work, the activation functions and a loss function are designed as follows:

$$\text{(Activation)} \quad \sigma_{enc}(x) = \begin{cases} 0, & x < 0 \\ x, & x \geq 0 \end{cases} \quad (6)$$

$$\text{(Activation)} \quad \sigma_{dec}(x) = \frac{1}{1 + e^{-x}}$$

$$(RE) \quad \text{Loss } (x^{(i)}, y^{(i)}) = \frac{1}{n} \sum_{k=1}^{n} (x_k^{(i)} - y_k^{(i)})^2$$

where, the activation functions $\sigma_{enc}(x)$ and $\sigma_{dec}(x)$ are also known as the Rectified Linear Unit (ReLU) and the sigmoid function, respectively. In this study, $\sigma_{enc}(x)$ is used for encoding (data compression), and $\sigma_{dec}(x)$ is employed for decoding (input reconstruction). For the loss function, mean-squared error is assigned.

Next, the network parameters $W_E$ and $W_D$ are updated by back-propagation algorithm. The parameters are adjusted where the loss function defined in Eq. (6) is minimized for all training examples. This framework uses Adaptive moment estimation (Adam) optimizer which is recommended for faster optimization than other methods such as Momentum optimization or Nesterov Accelerated Gradient.

The anomaly detector may generate a reconstruction error (RE) (912). The reconstruction error may include a measure between the input features and output features of the autoencoder model. The reconstruction error may be determined based on the loss function of the autoencoder. To classify anomalous signals from normal signals by (REs), the autoencoder should be trained purely with normal signals. After training without abnormal signals, the autoencoder produces larger RE when "unseen" data from abnormal status are fed in as input.

Accordingly, the autoencoder model 408 may be trained with features from normal (i.e. non-anomalous) operating conditions. After training, features derived in real-time may be fed into the autoencoder to measure RE values. During training time, by comparing the distributions of RE, a threshold can be set to distinguish the normal and the abnormal status.

In some examples, the system may include multiple autoencoders. Each auto-encoder may correspond to a particular component or group of component of a machine. Thus, each autoencoder be trained based on spectrogram features generated for normal conditions for the corresponding component(s).

The anomaly detector may determine whether an anomaly criterion is satisfied (914). The anomaly criteria may include a rule and/or logic that compares the reconstruction error with threshold(s). The threshold(s) may be determined based on the training and/or tuning of the autoencoder model 408. In some examples, multiple criteria and/or thresholds may be established for each autoencoder model 408 (and each corresponding component or group of components of the monitored machine 104).

In response to satisfaction of the anomaly criteria, the anomaly detector may generate an anomalous event (916). The anomalous event may include a message, signal, and/or notification that represents detection of an anomalous event. The anomalous event may identify the monitored machine 104, the component of the monitored machine 104, the type of event, and/or other information, statistics, and/or values calculated based on the machine learning model for anomalous detection. In response to the anomaly criteria not being satisfies, the anomalous event may not be generated, or the anomaly detector may generate some other event indicative of normal operation.

Figure 10:
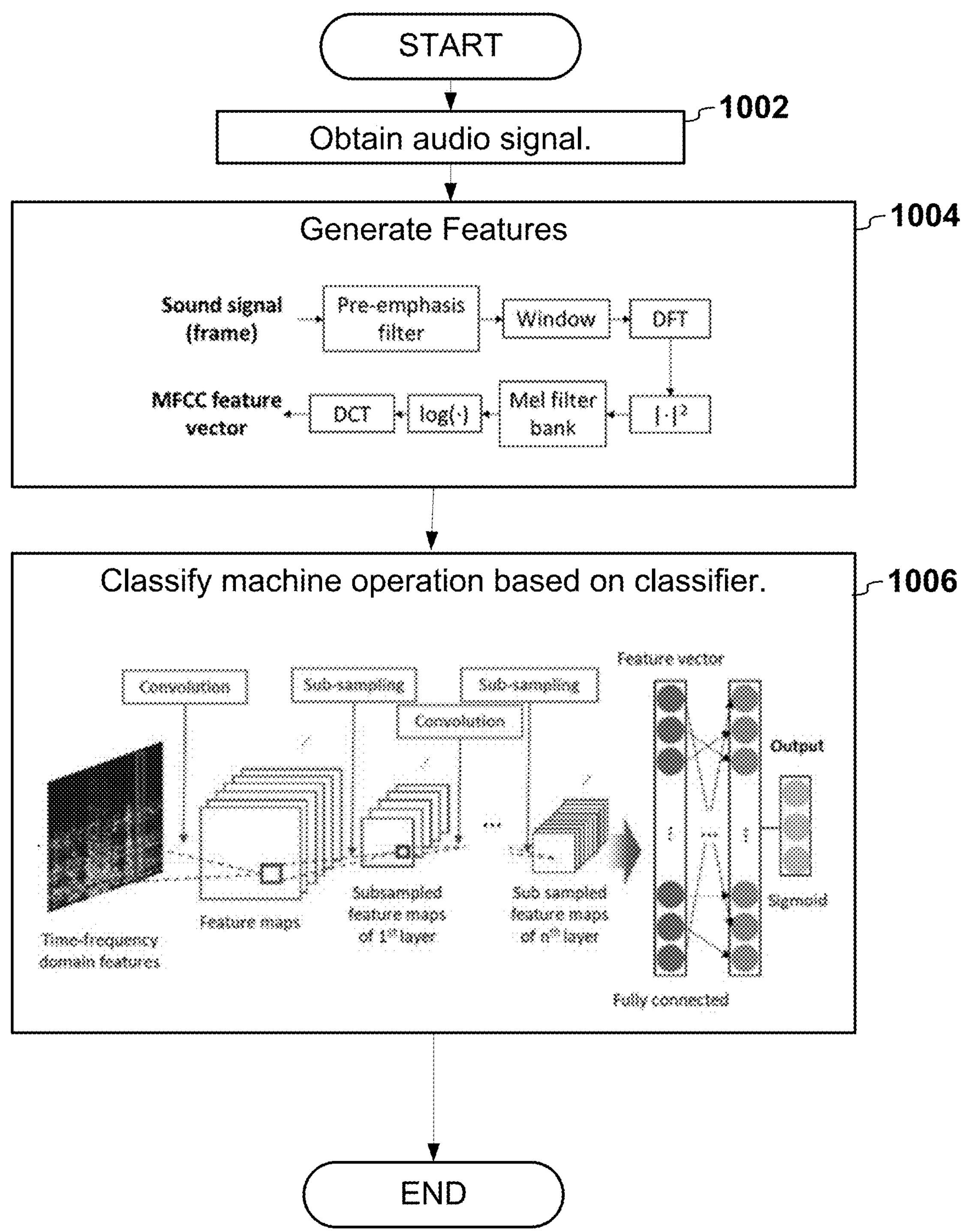
FIG. 10 illustrates example of logic for classifying machine operation.

FIG. 10 illustrates example of logic for classifying machine operation. The input controller may obtain an audio signal captured by one or more audio capture devices (1002). The feature extractor may generate features. For example, the feature extractor may apply Mel-Frequency Cepstral Coefficients (MFCC) to extract the spectral features. MFCCs use the Mel scale which is based on the human ear scale. MFCCs being considered as frequency domain features are much more accurate than time domain features. MFCC is a representation of the real cepstral of a windowed short-time signal derived from the Discrete Fourier Transform (DFT) of that signal. The difference from the real cepstral is that a nonlinear frequency scale is used, which approximates the behavior of the auditory system. Additionally, these coefficients are robust and reliable.

The speech signal is first divided into time frames. A length of the frame of sound signal may be selected to get the appropriate level of DFT bandwidth. For example 2,048 achieves a narrowband (30 Hz) DFT bandwidth of the sampling frequency. Overlapping of the frames may be used to smooth transition from frame to frame.

The next stage is to boost the amount of energy in the high frequency by introducing pre-emphasis filter:

$$y[n] = x[n] - ax[n-1] \quad (7)$$

where y is pre-filtered signal and x is the raw sound signal. Each time frame is then windowed with Hamming window to eliminate discontinuities at the edges. After the windowing, DFT is calculated from each frame to extract frequency components of a signal in the time-domain.

The logarithmic Mel-scaled filter bank is applied after DFT frame. This scale is approximately linear up to 1 kHz, and then logarithmic at greater frequencies. The relation between frequency and Mel scale shows in Eq. (8).

$$m = 2597 \log_{10}\left(1 + \frac{f}{700}\right) \quad (8)$$

where m and f are Mel and Herz, respectively. Each filter in the filter bank is triangular having a response of 1 at the center frequency and decrease linearly towards 0 till it reaches the center frequencies of the two adjacent filters where the response is 0. Then, the outputs from the filter bank converted to log-Mel spectrum. The last step is to calculate discrete cosine transformation (DCT) of the Mel spectrogram. DCT ranges coefficients according to significance.

The Classifier may classify machine operation based on a classifier (1006). A machine learning model and multi-label classification may be accessed to estimate machine statuses from sound features. For example, a convolutional neural network (CNN) may be utilized for the machine learning model. In the case of a 1D CNN, each label may have binary values. To train the 1D CNN model, maximizing F1 score was used which is effective to multi-label classification. Confusion matrix is defined in table 1. F1 score is defined as $$F1 = \frac{2TP}{2TP + FP + FN} \tag{9}$$

In 1D CNN input, MFCC feature vectors form one or more sensors may be used. In some examples, sensor fusion (SF) was used to achieve high performance. In SF, all sensors may form a multi-layer 1D CNN. Therefore, (40×4) inputs may be used to the input layer of the 1D CNN. TABLE 2 shows an example of the parameters and output shapes of the CNN networks. In each convolution layer and hidden layer, ReLU activation function may be used. The output layer may be activated by Sigmoid function.

TABLE 1

| Confusion Matrix | | |
|---|---|---|
| | True Positive | True Negative |
| Predicted Positive | TP | FP |
| Predicted Negative | FN | TN |

TABLE 2

| CNN layers | | |
|---|---|---|
| Layer (type) | Output Shape | Parameters |
| Conv 1D | (38, 64) | 832 |
| Conv 1D | (36, 128) | 24704 |
| Max pooling | (36, 128) | — |
| Fully connected | (2304) | — |
| Hidden layer | (512) | — |
| Output | (5) | 1180160 |

The operations shown in FIG. 5 may include additional, different, or fewer operations than illustrated in FIG. 5. The operations may be executed in a different order than illustrated in FIG. 5.

Figure 11:
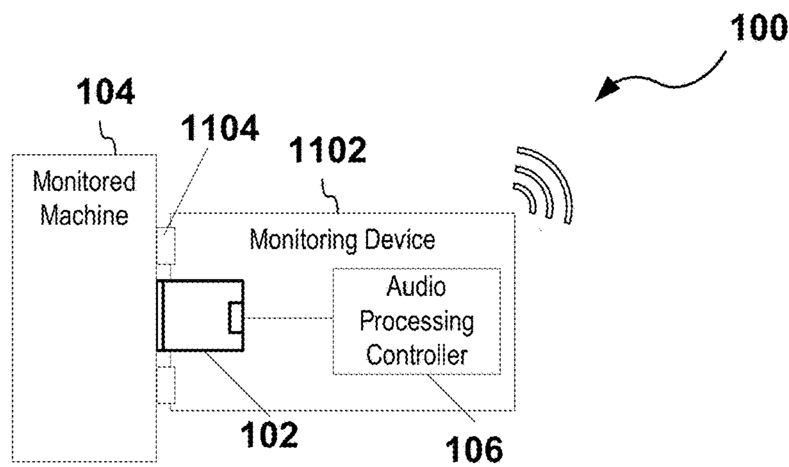
FIG. 11 illustrates a second example of a system.

FIG. 11 illustrates a second example of the system 100. In some examples, the system may include a monitoring device. The monitoring device may include the audio capture device 102 and the audio processing controller 106. Accordingly, the monitoring device may be integrated such that the monitoring device may send communication data that includes machine activity classifications, anomalous event detection information, and other derived information described herein. In some examples, information transmitted by the monitoring device 1102 may be communicated via wireless or wired communications (though wired may be preferable in remote locations).

In some examples, the monitoring device and/or the audio capture device may include a securing mechanism 1104. The securing mechanism may include, for example a clamp, magnet(s), a strap, etc.

Figure 12:
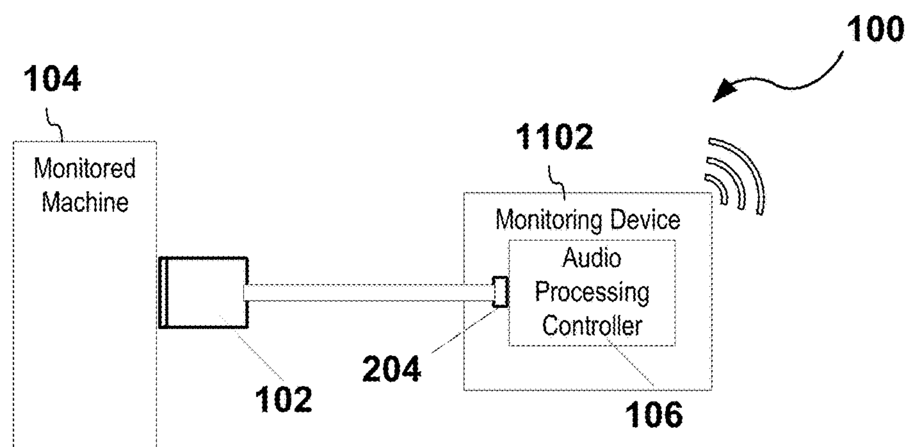
FIG. 12 illustrates a third example of a system.

FIG. 12 illustrates a third example of the system 100. The monitoring device 1102 illustrated in FIG. 12 includes the microphone 204 and/or the audio processing controller 106. The microphone 204 is located away from the monitored machine 104 to reduce noise from other machines, unmonitored components, and other unwanted sources. In other examples, the monitoring device 1102 may receive audio signals from the microphone and then transmit the audio signals to an audio processing controller that is positioned remote from the monitoring device 1102.

Figure 13:
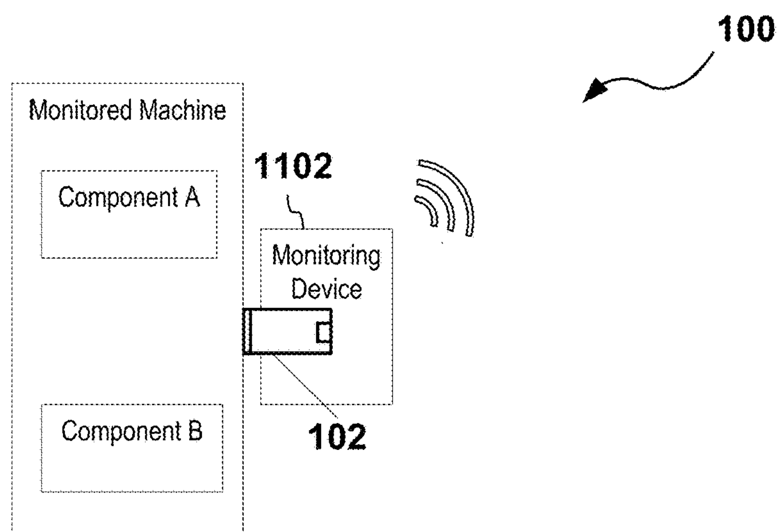
FIG. 13 illustrates a fourth example of a system.

FIG. 13 illustrates a fourth example of the system 100. The monitoring device 1102 may be positioned on the machine such that the audio capture device 102 captures sound generated by one or more components of the machine.

As illustrated in FIG. 13, the monitoring device 1102 may be attached to the machine at a location that is not directly over, touching, or adjacent to a particular component. For example, the capturing device may include a first component and a second component (and/or additional components, in other examples). The first component may be located at a first location on the machine and the second component may be located at a second location on the machine. The monitoring device 602 may be located at a third location that is between the first component and the second component. For example, the monitoring device may be attached to a surface of the machine between the first location and the second location. In some examples, vibrations attributable to one or both of the components may travel along a structure of the machine to the monitoring device. Central placement of the monitoring between the components may ensure that the vibration and/or sound from one component are not favored over another.

Figure 14:
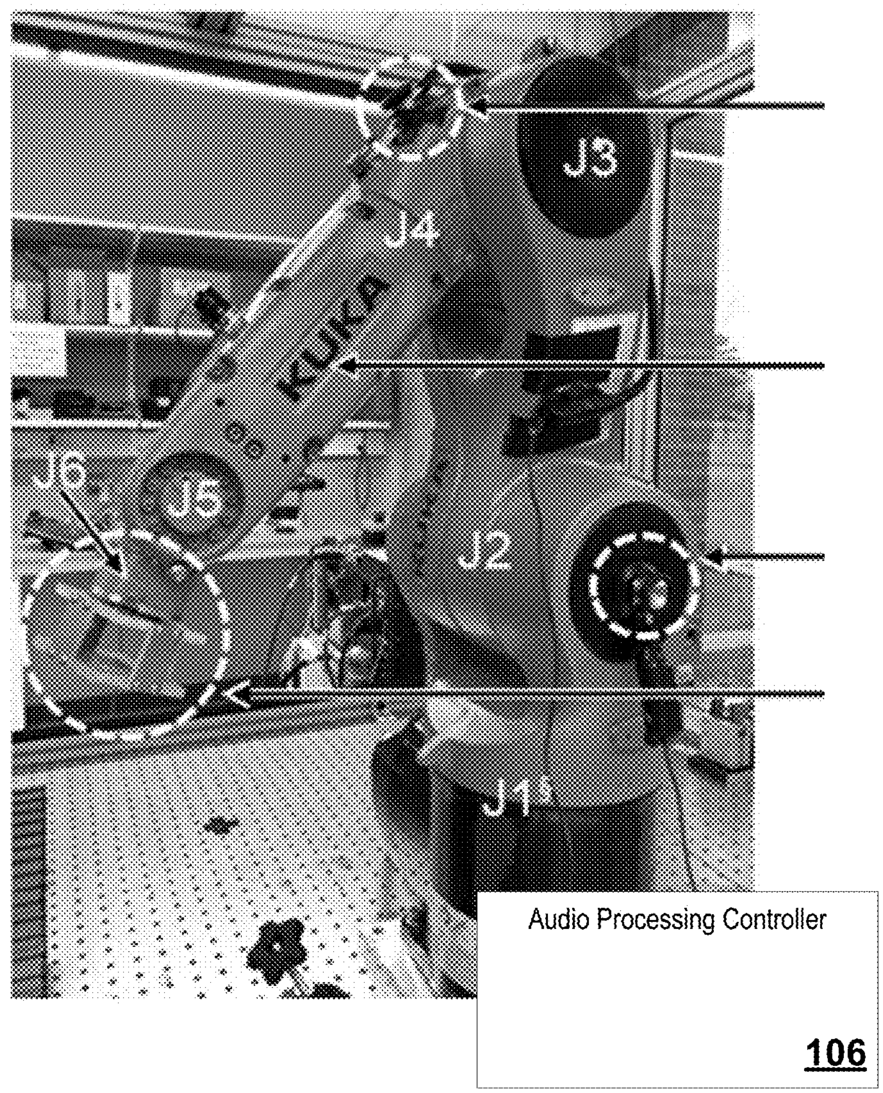
FIG. 14 illustrates a fifth example of a system.

FIG. 14 illustrates fifth example of the system 100. One or more monitoring devices (two shown in FIG. 14) may be positioned on a target machine. The components may include, for example, motors, servos, gears, or other parts of the machine that generate audible sound. By way of example, the machine may include a robotic arm and the components may include motors that operate joints of the robotic arm, such as illustrated in FIG. 14. Each of the joints may be considered a component monitored by the audio processor controller 106. As previously discussed, the audio processor controller 106 may include multiple autoencoders where each autoencoder is trained for a corresponding joint.

The system 100 may be implemented with additional, different, or fewer components than illustrated. Each component may include additional, different, or fewer components.

Figure 15:
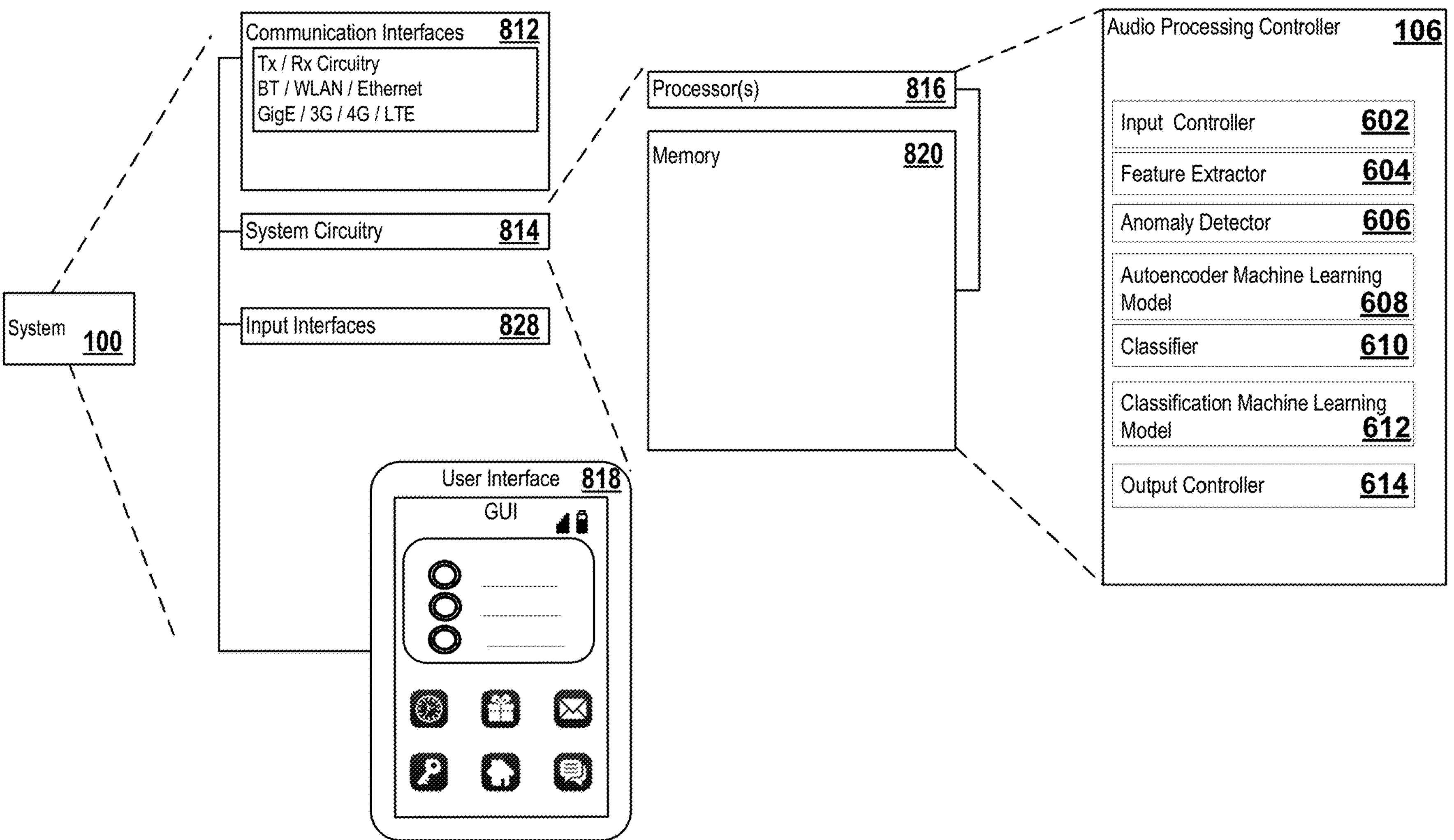
FIG. 15 illustrates a sixth example of a system.

FIG. 15 illustrates a sixth example of the system 100. The system 100 may include communication interfaces 812, input interfaces 828 and/or system circuitry 814. The system circuitry 814 may include a processor 816 or multiple processors. Alternatively or in addition, the system circuitry 814 may include memory 820.

The processor 816 may be in communication with the memory 820. In some examples, the processor 816 may also be in communication with additional elements, such as the communication interfaces 812, the input interfaces 828, and/or the user interface 818. Examples of the processor 816 may include a general processor, a central processing unit, logical CPUs/arrays, a microcontroller, a server, an application specific integrated circuit (ASIC), a digital signal processor, a field programmable gate array (FPGA), and/or a digital circuit, analog circuit, or some combination thereof.

The processor 816 may be one or more devices operable to execute logic. The logic may include computer executable instructions or computer code stored in the memory 820 or in other memory that when executed by the processor 816, cause the processor 816 to perform the operations of the audio processing controller 106, input controller 602, the feature extractor 604, the anomaly detector 606, the autoencoder model 608, the classifier 610, the classification model 612, the output controller 614, and/or system 100. The computer code may include instructions executable with the processor 816.

The memory 820 may be any device for storing and retrieving data or any combination thereof. The memory 820 may include non-volatile and/or volatile memory, such as a random access memory (RAM), a read-only memory (ROM), an erasable programmable read-only memory (EPROM), or flash memory. Alternatively or in addition, the memory 820 may include an optical, magnetic (hard-drive), solid-state drive or any other form of data storage device. The memory 820 may include at least one of the processor 816, cause the processor 816 to perform the operations of the audio processing controller 106, the input controller 602, the feature extractor 604, the anomaly detector 606, the autoencoder model 608, the classifier 610, the classification model 612, the output controller 614, and/or system 100. Alternatively or in addition, the memory may include any other component or sub-component of the system 100 described herein.

The user interface 818 may include any interface for displaying graphical information. The system circuitry 814 and/or the communications interface(s) 812 may communicate signals or commands to the user interface 818 that cause the user interface to display graphical information. Alternatively or in addition, the user interface 818 may be remote to the system 100 and the system circuitry 814 and/or communication interface(s) may communicate instructions, such as HTML, to the user interface to cause the user interface to display, compile, and/or render information content. In some examples, the content displayed by the user interface 818 may be interactive or responsive to user input. For example, the user interface 818 may communicate signals, messages, and/or information back to the communications interface 812 or system circuitry 814.

The system 100 may be implemented in many ways. In some examples, the system 100 may be implemented with one or more logical components. For example, the logical components of the system 100 may be hardware or a combination of hardware and software. The logical components may include the processor 816, cause the processor 816 to perform the operations of the audio processing controller 106, input controller 602, the feature extractor 604, the anomaly detector 606, the autoencoder model 608, the classifier 610, the classification model 612, the output controller 614, and/or any component or subcomponent of the system 100. In some examples, each logic component may include an application specific integrated circuit (ASIC), a Field Programmable Gate Array (FPGA), a digital logic circuit, an analog circuit, a combination of discrete circuits, gates, or any other type of hardware or combination thereof. Alternatively or in addition, each component may include memory hardware, such as a portion of the memory 820, for example, that comprises instructions executable with the processor 816 or other processor to implement one or more of the features of the logical components. When any one of the logical components includes the portion of the memory that comprises instructions executable with the processor 816, the component may or may not include the processor 816. In some examples, each logical component may just be the portion of the memory 820 or other physical memory that comprises instructions executable with the processor 816, or other processor(s), to implement the features of the corresponding component without the component including any other hardware. Because each component includes at least some hardware even when the included hardware comprises software, each component may be interchangeably referred to as a hardware component.

Some features are shown stored in a computer readable storage medium (for example, as logic implemented as computer executable instructions or as data structures in memory). All or part of the system and its logic and data structures may be stored on, distributed across, or read from one or more types of computer readable storage media. Examples of the computer readable storage medium may include a hard disk, a floppy disk, a CD-ROM, a flash drive, a cache, volatile memory, non-volatile memory, RAM, flash memory, or any other type of computer readable storage medium or storage media. The computer readable storage medium may include any type of non-transitory computer readable medium, such as a CD-ROM, a volatile memory, a non-volatile memory, ROM, RAM, or any other suitable storage device.

The processing capability of the system may be distributed among multiple entities, such as among multiple processors and memories, optionally including multiple distributed processing systems. Parameters, databases, and other data structures may be separately stored and managed, may be incorporated into a single memory or database, may be logically and physically organized in many different ways, and may implemented with different types of data structures such as linked lists, hash tables, or implicit storage mechanisms. Logic, such as programs or circuitry, may be combined or split among multiple programs, distributed across several memories and processors, and may be implemented in a library, such as a shared library (for example, a dynamic link library (DLL).

All of the discussion, regardless of the particular implementation described, is illustrative in nature, rather than limiting. For example, although selected aspects, features, or components of the implementations are depicted as being stored in memory(s), all or part of the system or systems may be stored on, distributed across, or read from other computer readable storage media, for example, secondary storage devices such as hard disks, flash memory drives, floppy disks, and CD-ROMs. Moreover, the various logical units, circuitry and screen display functionality is but one example of such functionality and any other configurations encompassing similar functionality are possible.

The respective logic, software or instructions for implementing the processes, methods and/or techniques discussed above may be provided on computer readable storage media. The functions, acts or tasks illustrated in the figures or described herein may be executed in response to one or more sets of logic or instructions stored in or on computer readable media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one example, the instructions are stored on a removable media device for reading by local or remote systems. In other examples, the logic or instructions are stored in a remote location for transfer through a computer network or over telephone lines. In yet other examples, the logic or instructions are stored within a given computer and/or central processing unit ("CPU").

Furthermore, although specific components are described above, methods, systems, and articles of manufacture described herein may include additional, fewer, or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Flags, data, databases, tables, entities, and other data structures may be separately stored and managed, may be incorporated into a single memory or database, may be distributed, or may be logically and physically organized in many different ways. The components may operate independently or be part of a same apparatus executing a same program or different programs. The components may be resident on separate hardware, such as separate removable circuit boards, or share common hardware, such as a same memory and processor for implementing instructions from the memory. Programs may be parts of a single program, separate programs, or distributed across several memories and processors.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments have been described, it will be apparent to those of ordinary skill in the art that many more embodiments and implementations are possible. Accordingly, the embodiments described herein are examples, not the only possible embodiments and implementations.

What is claimed is:

1. A device comprising:

an audio capture device configured to attach to a mechanical apparatus comprising a first component and a second component, wherein the first component and second component separately generate audible noise, the audio capture device comprising a body, a diaphragm disposed in the body, and a microphone, wherein the diaphragm is configured to vibrate in response to sound generated by the mechanical device and the microphone is configured to generate a signal in response audio caused by vibration of the diaphragm;

a processor, the processor configured to:

receive the signal generated by the microphone of the audio capture device;

determine, based on a first machine learning model and the signal, one of the first and second components is activated for operation;

determine, based on a second machine learning model and the signal, an anomalous event associated with the first component, a second component, or a combination thereof; and output a data message indicative of the anomalous event.

2. The device of claim 1, wherein to determine, based on the second machine learning model and the signal, an anomalous event associated with the first component, a second component, or a combination thereof, the processor is further configured to:

generate a spectrogram based on the signal;

generate a feature set for the machine learning model based on the spectrogram, or a portion thereof;

generate, based on the feature set and the machine learning model, a reconstruction error measurement; and determine the reconstruction error satisfies an anomaly criterion.

3. The device of claim 1, wherein the second machine learning model comprises an autoencoder neural network.

4. The device of claim 1, wherein first machine learning model comprises a convolutional neural network.

5. The device of claim 1, wherein the processor is further configured to:

include, in the data message, a component identifier corresponding to the one of the first and second components that is activated for operation so that the data message associates the component identifier and the anomalous event.

6. The device of claim 1, wherein the diaphragm is positioned on a first side of the body and the microphone is positioned on a second side of the body, the first side configured to be proximal to the machine and the second side configured to be being distal to the machine.

7. The device of claim 6, wherein the body is tapered between the first end and second end such that the first end is wider than the second end.

8. The device of claim 1, wherein the audio capture device further comprises a hose coupled to the body, the hose extending away from the body, wherein the microphone is located an end of the hose away from the device.

9. The device of claim 8, wherein the microphone is at least partially disposed in the hose.

10. The device of claim 1, wherein the machine is a mechanical arm, the first component is a motor for a first joint of the arm and the second component is a motor for a second joint of the arm.

11. The device of claim 1, wherein the first component is located at a first location on the machine and the second component is located at a second location on the machine, wherein the audio capture device is configured to attach to a third location on the machine in between the first location and the second location.

12. A system comprising:

an audio capture device configured to attach to a machine comprising a first component and a second component, the audio capture device comprising a body, a diaphragm disposed in the body, and a microphone, wherein the diaphragm is configured to vibrate in response to sound generated by the machine and the microphone is configured to generate a signal in response audio caused by vibration of the diaphragm;

a processor, the processor configured to:

receive the signal generated by the microphone of the audio capture device;

classify, based on a convolutional neural network and the signal, operation of the first component, the second component, or a combination thereof;

determine, based on an autoencoder neural network and the signal, an anomalous event corresponding to the first component, the second component, or a combination thereof; and output a data message identifying the anomalous event.

13. The system of claim 12, wherein to determine, based on the autoencoder neural network and the signal, the anomalous event, the processor is further configured to:

generate a spectrogram based on the signal;

generate a feature set for the machine learning model based on the spectrogram, or a portion thereof;

generate, based on the feature set and the machine learning model, a reconstruction error measurement; and determine the reconstruction error satisfies an anomaly criteria.

14. The system of claim 12, wherein the audio capture device further comprises a hose coupled to the body, the hose extending away from the body, wherein the microphone is located an end of the hose away from the device, the microphone comprising a second diaphragm disposed in the hose.

15. The system of claim 13, wherein the autoencoder neural network comprises a plurality of autoencoder neural networks, each of the neural networks trained to predict sound generated be a different one of the first and second components.

16. A method, comprising:

receiving an audio signal generated by a microphone of an audio capture device attached to a machine comprising a first component and a second component, the audio capture device comprising a body, a diaphragm disposed in the body, and a microphone, wherein the diaphragm is configured to vibrate in response to sound generated by the machine and the microphone is configured to generate a signal in response audio caused by vibration of the diaphragm;

determining, based on a first machine learning model and the audio signal, an anomalous event associated with the first component, a second component, or a combination thereof;

outputting a data message indicative of the anomalous event; and classifying, based on a second machine learning model and the audio signal, operation of the first component, the second component, or a combination thereof; and outputting a second data message indicative of the classified operation.

17. The method of claim 16, wherein the first machine learning model comprises an autoencoder neural network and the second machine learning model comprises an autoencoder neural network.

* * * * *